Feb. 27, 1923.

T. N. JORDAN

WHEEL

Filed Sept. 12, 1922

1,446,706

T. N. Jordan, Inventor

By ___ Attorneys

Patented Feb. 27, 1923.

1,446,706

UNITED STATES PATENT OFFICE.

THOMAS N. JORDAN, OF JACKSON, MISSISSIPPI.

WHEEL.

Application filed September 12, 1922. Serial No. 587,816.

*To all whom it may concern:*

Be it known that I, THOMAS N. JORDAN, a citizen of the United States, residing at Jackson, in the county of Hinds and State of Mississippi, have invented a new and useful Wheel, of which the following is a specification.

This invention relates to spring wheels and is designed as an improvement on the wheel shown in Patent No. 1,103,295 dated July 14, 1914 granted to T. N. Jordan.

One object of the invention is to provide a novel form of rim or felly, which forms a permanent part of the wheel and which is split to afford means for contraction or expansion of the rim to permit removal or positioning thereon of a demountable tire rim.

Another object of the invention is to provide the meeting ends of a split wheel rim with cooperating key ways to receive a key which is designed when driven in to force the ends of the wheel away from each other to adapt the rim to fit snugly within a tire rim.

Another object is to provide a spring wheel with novel means for connecting the outer ends of the spokes with the felly.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1:
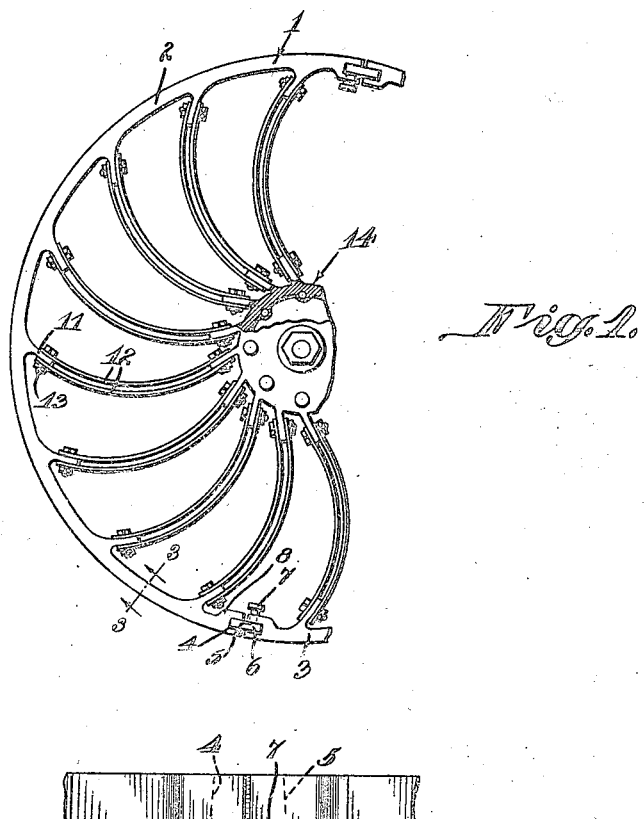
Figure 1 represents a side elevation of a portion of a wheel constructed in accordance with this invention, parts being broken away.
Figure 2:
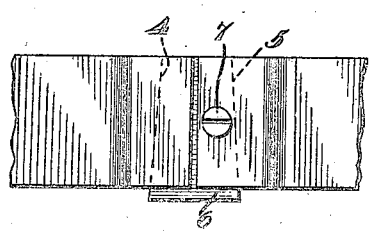
Fig. 2 is a detail bottom plan view showing the meeting ends of the two sections.
Figure 3:
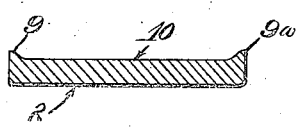
Fig. 3 is a transverse section taken on the line 3—3 of Fig. 1.

In the embodiment illustrated, the wheel 1 embodying this invention is constructed of two separably connected sections 2 and 3, the meeting ends of the sections having complementary key ways 4 and 5 to receive a key 6 which when driven in as shown in Figs. 1 and 2, will operate to separate the sections and which is held in operative position by a set screw 7. The key ways 4 and 5 are formed in a boss or enlargement 8 of the inner faces of the sections 2 and 3.

The felly sections 2 and 3 are chamfered on their outer faces to form circumferentially extending seats 10 to receive the demountable rim of a tire, not shown. These seats 10 are provided along their side edges with radially extending lips 9 and 9ᵃ which assist in retaining the demountable rim in operative positon.

From the above description it will be understood that after the demountable rim which is annular in form has been slipped over the felly 1, the keys 6 are driven in which operate to expand the sections to maintain concentricity of the wheel and cause the felly 1 to fit snugly within the rim to be secured thereon. These keys 6 after being driven in are secured by the set screws 7.

To remove a demountable rim from this wheel the set screws 7 are loosened and the keys 6 backed out which will cause the felly 1 to contract and permit the tire carrying rim to be readily removed.

The wheel herein shown includes resilient metallic spokes 12 similar to those shown in the patent above referred to, and which are disposed in pairs, the spokes of each pair being alined circumferentially of the wheel and bowed, all of the spokes being bowed in a common direction circumferentially of the wheel. The inner ends of these spokes are connected with the wheel hub 14 in any suitable manner, and their outer ends are bolted to lugs or brackets 11 which are disposed at an obtuse angle to each other as is shown clearly in Fig. 1. These lugs or brackets 11 are made integral with the rim sections 2 and 3 whereby said sections are strengthened and they are secured to the spokes by bolts shown at 13.

I claim:—

1. A wheel of the class described comprising two detachably connected expansible and contractable non-telescoping sections with spoke attaching lugs carried by the inner faces of the sections and extended at oblique angles, said lugs being integral with the wheel sections.

2. A wheel of the class described comprising two rim sections having complementary key ways in their meeting ends, keys to be driven transversely through said key ways, and means for securing said keys in operative position.

3. A wheel of the class described comprising two rim sections having complementary key ways in their meeting ends, keys to be driven transversely through said key ways, means for securing said keys in operative position, said rim sections having their "outer" perimeters provided with circumferentially extending registering seats with radially extending lips along their side edges.

In testimony that I claim the foregoing as my own, I have hereto affixed my signature in the presence of two witnesses.

THOMAS N. JORDAN.

Witnesses:
   Mrs. G. L. Root,
   Ruth Kitnour.